April 26, 1960  H. H. LOGAN  2,933,962
NON-MARRING WRENCH FITTING FOR PIPES AND THE LIKE
Filed March 28, 1958

INVENTOR.
HUGH H. LOGAN
BY
ATTORNEY

United States Patent Office 2,933,962
Patented Apr. 26, 1960

2,933,962

NON-MARRING WRENCH FITTING FOR PIPES AND THE LIKE

Hugh H. Logan, Pasadena, Calif., assignor to Logan Manufacturing Company, Glendale, Calif., a corporation of California Application March 28, 1958, Serial No. 724,574

3 Claims. (Cl. 81—53)

This invention relates to a wrench fitting for pipes and the like.

Pipes and pipe nipples are commonly threaded into pipe fittings by means of pipe wrenches of various types, such as the conventional adjustable jaw pipe wrench. This form of pipe wrench, however, is not suitable for use on certain forms of pipe, such as chrome-plated pipe, since the serrated jaws of the wrench mar the pipe surface.

Flexible band type pipe wrenches avoid this disadvantage of the adjustable jaw wrenches. These flexible band wrenches, however, are difficult to use.

An object of this invention is the provision of a wrench fitting for a pipe which avoids the above and other deficiencies of conventional pipe wrenches.

A more specific object of the invention is the provision of a wrench fitting adapted to be threaded on a pipe to enable the latter to be turned by a conventional box wrench or the like without marring of the pipe.

Another object of the invention is the provision of a wrench fitting of the character described which may be securely locked against rotation on a pipe without deforming the latter.

Other objects, advantages and features of the invention will become readily apparent as the description proceeds.

The invention may be best understood from the following detailed description taken in connection with the annexed drawings, wherein.

Figure 1:
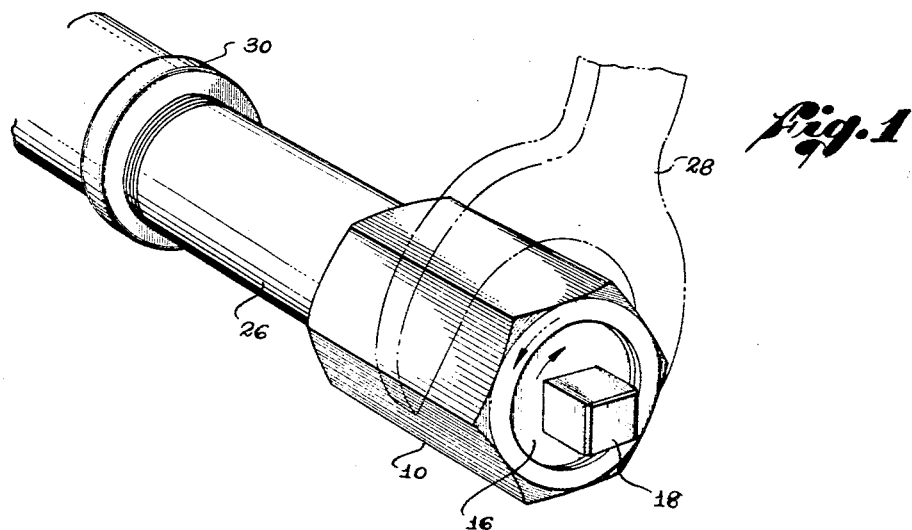
Fig. 1 is a view in perspective of the present wrench fitting threaded on a pipe nipple.

As shown in these drawings, the present wrench fitting comprises a sleeve-like member in the form of an elongate hexagonal nut 10. As shown, this nut has an axial bore extending into its left end which continues in a counterbore opening through the right end of the nut. The counterbored right-hand end of this nut is internally threaded with a machine screw thread 12. The left-hand end of the nut is formed with a conventional, tapered pipe thread 14.

Threaded in the right-hand end of the nut 10, is a cylindrical jam screw 16. This jam screw has a square stud 18 at its outer end engageable by a wrench for threading the jam screw in the nut 10, for reasons to be explained shortly.

The inner end of the jam screw is formed with a slightly reduced cylindrical extension 20. Extending into the end face of this extension is a shallow circular recess 22. The circular side wall 24 of this recess is tapered as shown and forms an annular seat for abutting the end of a pipe, as will now be described.

In use, one end of a pipe to be turned, such as the illustrated pipe nipple 26, is threaded into the left end of the nut 10 having the pipe threads 14. The dimension A of the internally reduced section of the nut formed with the pipe threads is such that the pipe will extend slightly beyond the latter section into the internally enlarged section of the nut having the machine screw threads 12. In practice, different sized wrench fittings for use on different sized pipes will be made.

The jam screw 16 is now threaded into the nut 10 and into forced contact with the end of the pipe so as to lock the latter against rotation with respect to the nut. An ordinary box wrench 28, or any other convenient wrench, may now be applied to the nut 10 and the latter turned by the wrench to thread the nipple 26 into a pipe fitting 30, for example. It will be apparent, of course, that if the jam screw 16 is tightened with sufficient force against the end of the nipple, the latter may be turned in either direction so as to enable threading of the same into or out of a pipe fitting.

Since the wrench does not engage the nipple directly, marring of the latter by the wrench is avoided. This is highly desirable, especially in the case of chrome-plated pipes and pipe nipples, for example. It will further be apparent that there is no tendency for the wrench to slip, as often happens with conventional flexible band wrenches.

As previously mentioned, the recess wall 24 on the jam screw forms a pipe engaging seat. To this end, the diameter of this wall or seat will be made to correspond to the end diameter of the pipe size for which the wrench fitting is designed.

Figure 2:
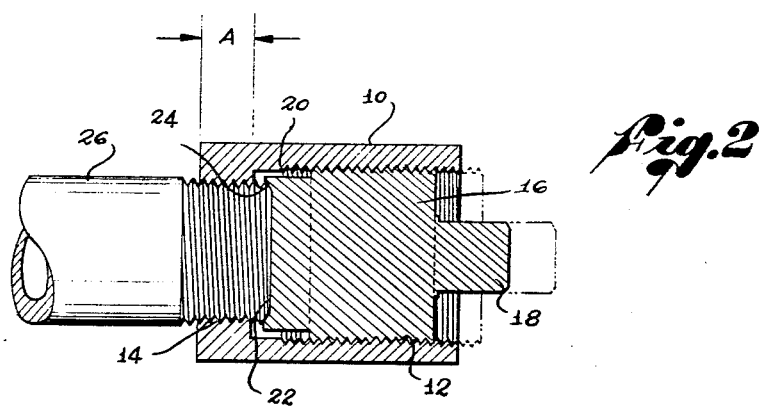
Fig. 2 is a longitudinal section through the wrench fitting of Fig. 1.
Figure 3:
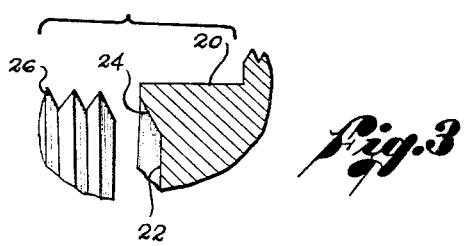
Fig. 3 is an enlarged detail illustrating a certain highly important and advantageous feature of the invention.

Also, as previously mentioned, the taper of the seat 24 constitutes a highly important and advantageous feature of the invention. Thus, as is well known in the art, the annular end surfaces of all threaded pipes are tapered at a standard angle, namely, 30 degrees. The included angle between the seat 24 and the turning axis of the jam screw is made the complement of this pipe angle, namely, 60 degrees, as may be readily observed in Figs. 2 and 3.

Accordingly, when the jam screw is tightened against the end of a pipe, the jam screw seat 24 bears flatly against the tapered end face of the pipe. There is, therefore, substantially no tendency for the end of the pipe to be flattened or crushed by the jam screw, as would be prone to occur if the latter were formed with merely a flat pipe engaging surface.

Further, the tapered seat 24 restrains the end of the pipe against outward expansion or deformation under the action of the axial force exerted thereon by the jam screw, as would occur if the latter had merely a flat pipe engaging surface. This restraining of the pipe against outward deformation is especially essential in those situations where it is necessary to force the jam screw very tightly against the pipe to prevent rotation between the pipe and nut 10. Such extreme tightening of the jam screw might be necessary when a pipe is to be unthreaded from a fitting, for example.

In this latter use of the present wrench fitting, the tapered seat 24 possesses the additional advantage of providing increased surface contact between the jam screw and pipe. This increased surface contact, in turn, affords increased frictional resistance to turning of the pipe in the nut. This, of course, is important when the pipe is being unthreaded, since the tendency then is for the pipe to turn in the nut in a direction back away from the jam screw.

The present wrench fitting may also be used with a conventional internal pipe wrench to unthread a pipe. In this use of the fitting, the jam screw is removed from the nut 10 and the latter is threaded on the pipe in the manner described. An internal pipe wrench is then inserted through the nut into the pipe, expanded against the internal surface of the latter, and turned to unthread the pipe in the usual manner. The nut, in this instance, prevents the pipe from being stretched or otherwise deformed by the internal pipe wrench, as often occurs when the latter is used by itself.

It will be apparent, therefore, that there has been described and illustrated a wrench fitting for pipes which is fully capable of attaining the objects and advantages preliminarily set forth.

While a preferred embodiment of the invention has been disclosed, the invention is not intended to be limited thereto but rather by the spirit and scope of the following claims.

I claim:

1. A wrench fitting of the character described, comprising: a multi-sided nut member adapted to be turned with a wrench, said member having an axial opening which is reduced in diameter at one end of the member, said one end of the nut member having an internal pipe thread to permit threading of the member on the threaded end of a pipe, the other end of said member having an internal screw thread, a jam screw threaded in said other end of said member, means on the outer end of said jam screw to receive a wrench for turning the jam screw in the nut member, and the inner end of said jam screw comprising a reduced axial extension having an annular tapered seat substantially concentric with the turning axis of the jam screw for engaging the end of a pipe threaded in the nut member.

2. The subject matter of claim 1 wherein the included angle between said tapered seat and said axis is approximately 60 degrees.

3. A wrench fitting comprising a generally sleeve-like member to be turned with a wrench, said member having a threaded bore extending axially into one end and continuing in an enlarged, threaded counterbore which opens through the other end of the member, a jam screw threaded in said counterbore, and the inner end of the jam screw having an annular tapered seat substantially concentric with the turning axis of the jam screw.

References Cited in the file of this patent

UNITED STATES PATENTS

| | | |
|---|---|---|
| 1,371,965 | York | Mar. 15, 1921 |
| 1,566,691 | Perry | Dec. 22, 1925 |
| 2,694,328 | La Freniere | Nov. 16, 1954 |

FOREIGN PATENTS

| | | |
|---|---|---|
| 150,473 | Great Britain | Sept. 9, 1920 |
| 564,529 | Great Britain | Oct. 2, 1944 |
| 695,021 | Great Britain | Aug. 5, 1953 |